UNITED STATES PATENT OFFICE.

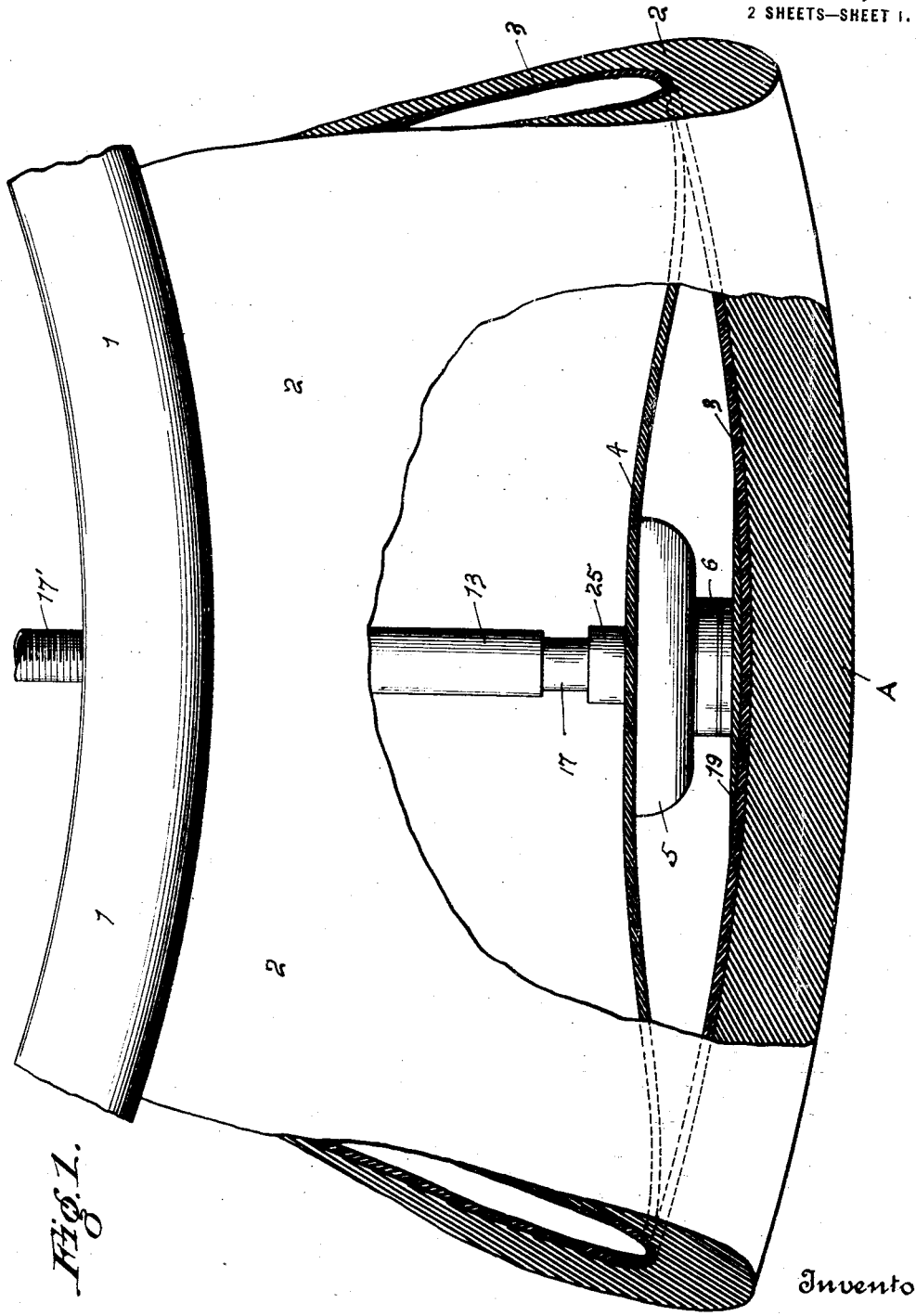

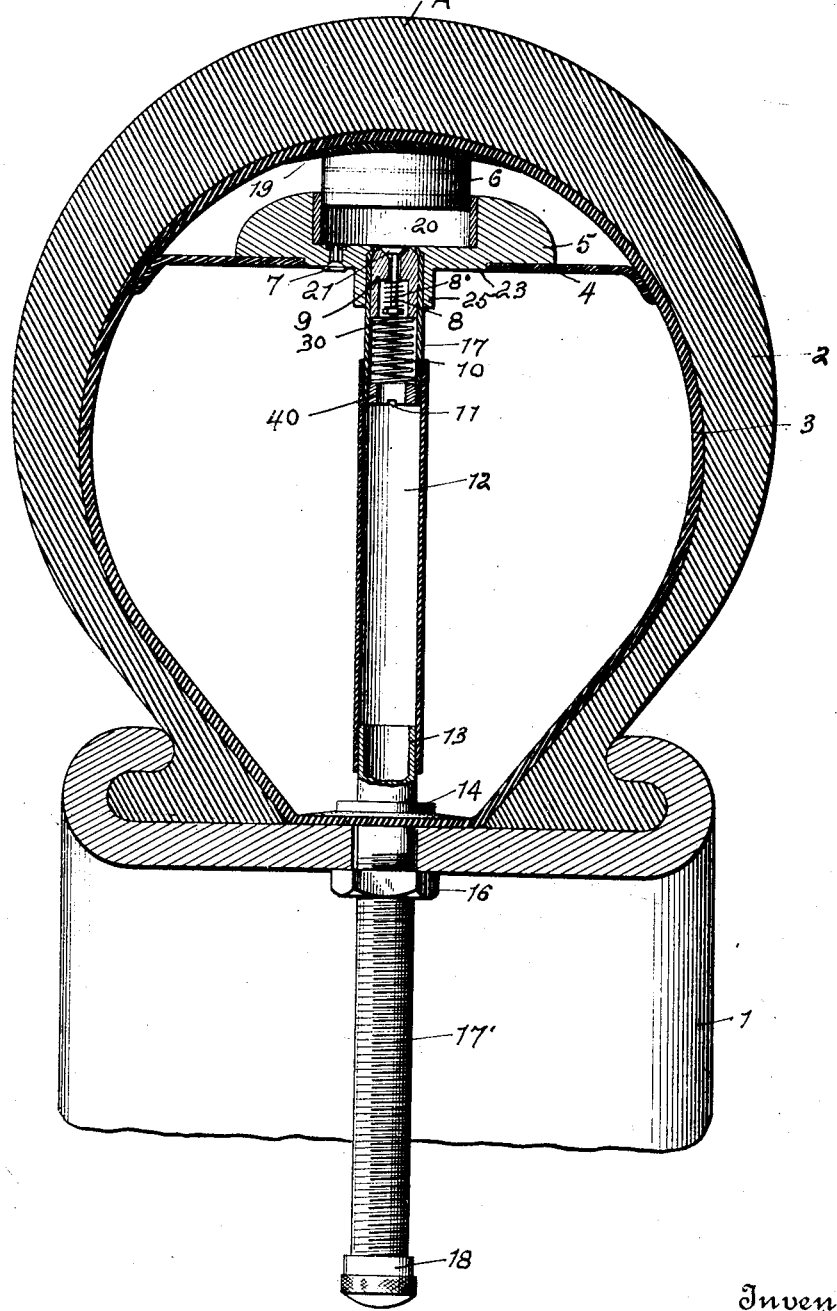

EUGENE S. HAYFORD, OF NEW ORLEANS, LOUISIANA.

PNEUMATIC-TIRE INFLATER.

1,348,111.     Specification of Letters Patent.     Patented July 27, 1920.

Application filed October 9, 1919. Serial No. 329,461.

*To all whom it may concern:*

Be it known that I, EUGENE S. HAYFORD, a citizen of the United States, residing at New Orleans, in the parish of Orleans and State of Louisiana, have invented new and useful Improvements in Pneumatic-Tire Inflaters, of which the following is a specification.

My present invention pertains to pneumatic tires and it contemplates the provision in a tire of the character set forth of means whereby the depression in a pneumatic tire caused by change of weight on the tire will give motion to a mechanism for inflating the tire; said means being equipped with a self adjusting relief valve so constructed and arranged as to maintain a constant pressure on the tire.

It is a well known fact that during the revolution of a vehicle wheel there is a positive depression of at least ⅜″ of the pneumatic tire, and it is one of the objects of this invention to arrange within the inner tube of a tire a device that will utilize said depression to replenish the air within said tire.

Other objects and characteristic features of the invention will be understood from the following description and claim when the same are read in connection with the drawings accompanying and forming part of this specification, in which:

Figure 1 is a side elevation of a portion of a pneumatic tire with the front wall thereof cut away to show the application of my device.

Fig. 2 is a sectional view showing my novel device as equipped to a pneumatic tire.

Similar numerals represent corresponding parts in both views of the drawings.

The rim 1, outer casing 2, and inner tube 3 are of the well known construction and at a suitable point in the circumference of the inner tube I provide my novel tire inflating means which comprises in the preferred construction the cylinder 6 secured to a plate of metal or fabric 19 which in turn is secured in any suitable manner to the inside upper wall of the inner tube.

Surrounding the cylinder 6 is the member 5 of my novel device and said member is preferably formed of hard rubber and of cup shape as illustrated. The said member is provided with a well or chamber 20 to receive the cylinder and in its lower end I provide an inlet 21 for compressed air. At a point preferably off the center of the member I provide a compressed air outlet 7 that communicates at its outer end toward the tread 2 with the cylinder chamber 20 and at its inner end with the interior of the inner tube.

The member 5 is secured in proper position within the inner tube 3 by means of a partition 4 that surrounds and rests in the wall 23 of said member.

It is my purpose to form the member 5 and portion 19 in the manner illustrated and of such material as will greatly reduce the liability of injury to the inner casing of the tire.

At its lower or inner end, the member 5 is provided with a flange 25. The said flange receives a casing 17 that in turn is secured at its opposite end and communicates with a flexible tubing 12.

Within the casing 17 I arrange a valve stem 8 that seats at 21 and is surrounded by a spring 8′. The said spring abuts at its lower end against a nut 30 and at its upper end the spring 8′ abuts against one wall of a relief valve 9 that completely surrounds said spring 8′ and valve stem 8. The valve 9 seats at 9′ against the upper end of the casing 17 as illustrated.

Directly below the relief valve 9, I provide within the casing 17 a large spring 10 that maintains a uniform tension on said valve 9 so as to regulate the pressure in the tube 3 and also to compensate for sudden jar and the like of the vehicle wheel.

At its lower end, the casing 17 is provided with a nut 40 that is threaded in the said casing and has a longitudinal central opening 11. The said nut serves for regulating the tension of the spring 10.

At its opposite end the flexible tube 12 surrounds and communicates with an air inlet tube 13 that in turn is secured in the rim 1 of the vehicle wheel by a plate 14 and nut 16.

At its upper end the air inlet tube 13 is threaded at 17′ to receive the nut 16 and at its extreme upper end the tube 13 is provided with a cap 18 in which a small slot (not shown) for atmospheric air is provided.

It is well to state at this point that the pressure regulating valve 8 is so arranged as to maintain a uniform pressure at all times on the tire and I would also have it distinctly understood that I do not wish to confine myself to the exact configuration and size of member or valve and appurtenances as in the future practice of the device it will be necessary, because of the pressure in the tire being somewhat less than that in the pump, that said tire have a greater surface than the member in order to support the member erect within the tire and present a solid surface for the casing to compress against; the drawings accompanying this specification being simply for the purpose of illustrating my novel invention.

The size and weight of the plunger 17 will necessarily vary according to the size of the tire to which my invention is applied.

In the practical operation of the device where the wheel of a vehicle revolves, the outer casing 2 will be depressed at the point A by weight of the vehicle. This causes the inner walls of the casing to press upwardly against the diaphragm and because of the means for compressing air comprising the cylinder, valve and plunger being put in operation air will be compressed in the chamber 20 and forced out of the discharge opening 7 and thence into the inner tube of the tire. By reason of the compressing means being in communication with the outer atmosphere, too great an amount of compression will be overcome.

It will be gathered from the foregoing that the device is simple in construction and positive in action, contains no delicate parts such as are likely to become broken or impaired in operation and when arranged within an inner tube of a vehicle tire may be depended upon to maintain an even pressure within the casing and prevent wear on the tire casing due to deflation or over inflation.

Having described my invention, what I claim and desire to secure by Letters-Patent is:

The combination of a casing, an inner tube arranged in said casing and means communicating with the inner tube for inflating the same, said means comprising a cup-shaped member, a flexible portion to which the member is secured, a chamber formed in the member, a cylinder that is movable longitudinally in the chamber, and an air inlet and outlet orifice communicating with the chamber whereby on inward movement of the cylinder, air will be forced from the chamber into the inner tube, and on outward movement of the cylinder, air will be drawn into the chamber, and means communicating with one end of the chamber for closing the inlet orifice thereof.

In testimony whereof I have hereunto set my hand in presence of two subscribing witnesses.

EUGENE S. HAYFORD.

Witnesses:
　THOS. W. KRACKE,
　R. A. ROBY.